United States Patent [19]

Shimano

[11] 4,344,659
[45] Aug. 17, 1982

[54] SEALING CONSTRUCTION FOR A ROTATING PORTION AT A BICYCLE

[75] Inventor: Keizo Shimano, Sakai, Japan

[73] Assignee: Shimano Industrial Company Limited, Osaka, Japan

[21] Appl. No.: 158,268

[22] Filed: Jun. 10, 1980

[30] Foreign Application Priority Data

Jun. 20, 1979 [JP] Japan .............................. 54-85324[U]

[51] Int. Cl.$^3$ ........................ F16C 33/80; F16C 19/06
[52] U.S. Cl. .................................. 308/187.1; 308/192
[58] Field of Search ..................... 308/23.5, 187.1, 192

[56] References Cited

U.S. PATENT DOCUMENTS

| | | | |
|---|---|---|---|
| 613,489 | 11/1898 | Buehler | 308/192 |
| 628,941 | 7/1899 | Janney | 308/192 |
| 1,991,077 | 2/1935 | Brittain, Jr. | 308/187.1 |
| 2,081,567 | 5/1937 | Winkler | 308/192 |
| 4,145,095 | 3/1979 | Segawa | 308/192 |
| 4,213,656 | 7/1980 | Olschewski et al. | 308/187.1 |

FOREIGN PATENT DOCUMENTS

| | | | |
|---|---|---|---|
| 297438 | 4/1917 | Fed. Rep. of Germany | 308/192 |
| 906051 | 7/1949 | Fed. Rep. of Germany | 308/192 |
| 1029742 | 6/1953 | France | 308/187.1 |

Primary Examiner—Richard R. Stearns
Attorney, Agent, or Firm—Stevens, Davis, Miller & Mosher

[57] ABSTRACT

A sealing construction for rotating portions of a bicycle, in which a first and a second sealing member of ring-like shape are combined with a bearing cone of a bearing supporting a rotary member, the bearing cone extends axially outwardly to form an extension, and at the peripheral surface thereof and at the first and second sealing members opposite to the peripheral surface, are provided ridges and grooves engageable therewith at minimum intervals therebetween, so that the first and second sealing members are brought into close contact with each other by fixing means, thereby being fixed to the rotary member or a stationary member.

6 Claims, 9 Drawing Figures

4,344,659

SEALING CONSTRUCTION FOR A ROTATING PORTION AT A BICYCLE

FIELD OF THE INVENTION

This invention relates to a sealing construction for a rotating portion of a bicycle, and more particularly to a sealing construction for a bicycle hub rotatably supporting a hub shell to a hub shaft through bearings.

In addition, this invention may be included with the rotating portions, other than in the hub, between a head pipe of the bicycle frame and a front fork supported rotatably to the head pipe, between a bottom bracket of the bicycle frame and a crank shaft supported rotatably to the bottom bracket, and between a pedal shaft and a pedal body supported rotatably thereto. The hub shaft, head pipe, bottom bracket and pedal shaft, correspond to stationary members described in this invention and the hub shell, front fork, crank shaft and pedal body, correspond to rotary members.

BACKGROUND OF THE INVENTION

Generally, a sealing construction applied to each rotating portion according to the foregoing, uses a ring-like shaped sealing member formed of a flexible material, so that the sealing member mounted on the stationary member or rotary member closes a gap between the stationary and rotary members, thereby preventing dust or rain water from entering the bearings. The sealing member, however, contacts at its inner or outer periphery with the stationary member or rotary member to thereby close the gap. Hence, the sealing member does not provide sufficient sealing effect and includes a large amount of frictional resistance, resulting in hindrance of the rotary member from smooth and light rotation and also wear of the sealing member is rapid, whereby the sealing member does not withstand long use and requires an early replacement.

SUMMARY OF THE INVENTION

This invention has been designed to overcome the aforesaid problems. An object of the invention is to provide a sealing construction capable of rotating the rotary member smoothly and lightly and ensuring that a gap between the rotary member and the stationary member can prevent dust or rain water from entering the bearings, and further eliminating wear of the sealing member.

In detail, the sealing construction of the invention is so constructed that; a first and a second sealing member of ring-like shape are combined with a bearing cone at a bearing supporting the rotary member; the bearing cone extends axially outwardly to form an extension; at the peripheral surface of the extension and the first and second sealing members opposite thereto, are provided ridges and grooves engageable therewith at minimum intervals; and the first and second sealing members are brought into close contact with each other in ring-like shape through fixing means, thereby being fixed to the stationary member or rotary member.

The bearing cone is screwably fixed to one of the stationary member and rotary member by screw means and the first and second sealing members are mounted on the other. The sealing members, which are each semicircular, are easy to fit onto the peripheral surface of the bearing cone while engaging at the ridges and grooves on the sealing members with those on the peripheral surface. The sealing members engage with the bearing cone, leaving an annular, radially zigzag, and minimum opening, so as to close an annular space existing between the bearing cone and the stationary or rotary member. Hence, the zigzag gap ensures that its labyrinth effect can prevent dust or rain water from entering the bearings from the exterior.

Also, each sealing member is free from contact with the bearing cone so that the rotary member is not subjected to frictional resistance against its rotation, thereby rotating smoothly, and the sealing members are prevented from wearing.

BRIEF DESCRIPTION OF THE DRAWINGS

An embodiment of the sealing construction of the invention applied to the bicycle hub is shown in the drawings, in which.

DETAILED DESCRIPTION OF THE INVENTION

Figure 1:
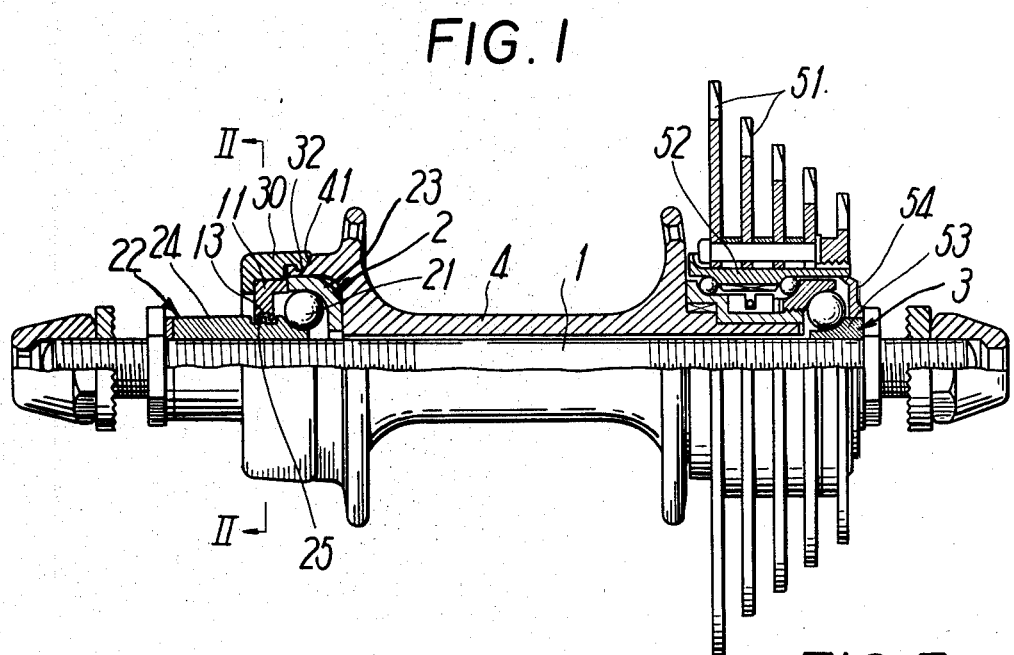
FIG. 1 is a partially cutaway front view.
Figure 2:
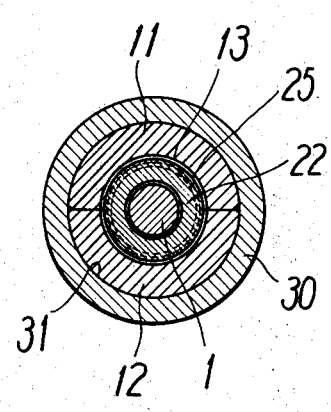
FIG. 2 is a sectional view taken on the line II—II in FIG. 1.

An embodiment in accordance with a sealing construction of the invention is shown in the drawings applied to the bicycle hub supporting a hub shell 4 rotatably to a hub shaft 1 through a first and a second bearing 2 and 3.

In detail, the embodiment of the sealing construction seals a gap between the hub shell 4 and the hub shaft 1 positioned axially outwardly of the bearing 2 at the left side of hub shell 4, the bearing 2 comprising balls 21, an inner bearing cone 22 having a ball race, and an outer bearing cone 23 pressfit into the hub shell 4.

The sealing construction of the invention comprises the combination of a first and a second sealing member 11 and 12 of a ring-like shape with the inner bearing cone 22. The bearing cone 22 extends axially outwardly from the ball race to form a cylindrical extension 24. The extension 24 is provided at its outer peripheral surface with two or more circumferential grooves 25, and the first and second sealing members 11 and 12 have at the inner surfaces thereof opposite to the peripheral surface of extension 24 ridges 13 which extend circumferentially and are engageable with the grooves 25 leaving minimum gaps. At both circumferential sides of each of the sealing members 11 and 12 are provided two end faces which are directed radially of the sealing member. The two end faces, when the first and second sealing members 11 and 12 are fit onto the inner bearing cone 22 through the engagement of ridges 13 with the groove 25, come into close contact with each other to couple the first and second sealing members 11 and 12 in ring-like shape. Thus, the first and second sealing members 11 and 12 all in close contact to be coupled in a ring-like shape and are fixed to the hub shell 4 through fixing means to be hereinafter described.

The aforesaid sealing construction is applied to the bicycle hub, in which the bearing cone 22 engageable with the sealing members 11 and 12 as foregoing may be substituted by the outer bearing cone 23. In this instance, the sealing members 11 and 12 are fixed to the hub shaft 1 and have grooves at the outer periphery.

Alternatively, the inner bearing cone 22 may have the ridges 13 and the first and second sealing members 11 and 12 may have the grooves 25 respectively, or each of the bearing cone 22 and sealing members 11 and 12 may have both ridges and grooves.

One or both of the first and second sealing members 11 and 12 may be divided circumferentially into two or more members. Also, the first and second sealing members 11 and 12 are formed mainly of metal or hard synthetic resin, or alternatively may be formed of elastic rubber or soft synthetic resin. In this instance, each of the sealing members 11 and 12 can be previously integrated at one end face thereof.

Next, fixing means for fixing to the hub shell 4 the first and second sealing members 11 and 12 brought into close contact at both end faces and coupled in ring-like shape, will be described.

Figure 3:
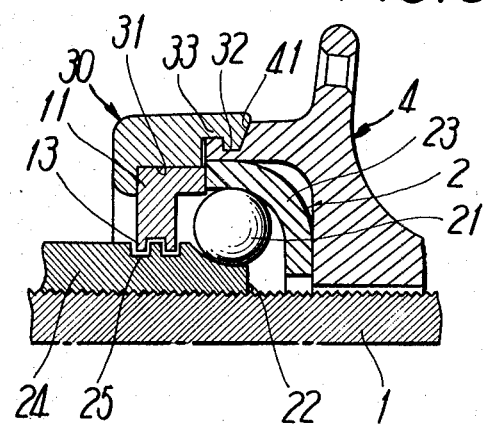
FIG. 3 is a partially enlarged sectional view.
Figure 4:
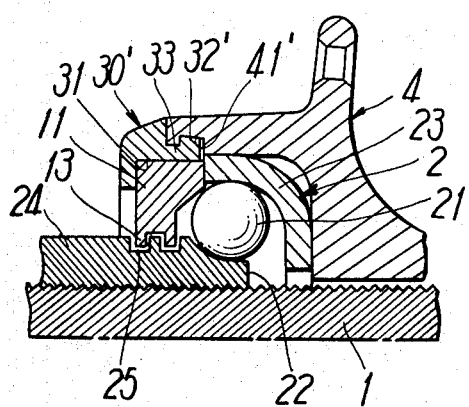
FIGS. 4 through 9 are partially enlarged sectional views of modified embodiments.

There are five fixing means as shown in FIGS. 3 through 9. A first fixing means, as shown in FIGS. 1, and 3, uses a ring-like shaped mounting member 30 which has a holding portion 31 for holding the outer periphery of the respective sealing members 11 and 12. The mounting member 30 is provided with a projection 32 extending circumferentially and projecting radially inwardly of the mounting member 30 and is connected axially rightwardly (in the drawing) thereto through a connecting portion 33. At the outer periphery of one axial end of hub shell 4 is provided a circumferential groove 41 engageable with the projection 32, so that the sealing members 11 and 12 are fit onto the holding portion 31 into close contact with each other at both end faces, and engage at the projection 32 with the groove 41, thereby being fixed to the hub shell 4. FIG. 4 shows a ring-like shaped mounting member 30' which is similar in construction to mounting member 30, but which has a radially outwardly extending projection 32' which engages with a circumferential groove 41' provided at the inner periphery of hub shell 4 to fix the mounting member 30' in place.

In addition, the projection 32 (FIG. 3) or 32' (FIG. 4) is elastically deformed through the connecting portion 33 to engage with the respective groove 41, 41'. Alternatively, the projection 32, 32' may be divided circumferentially at regular intervals.

Figure 5:
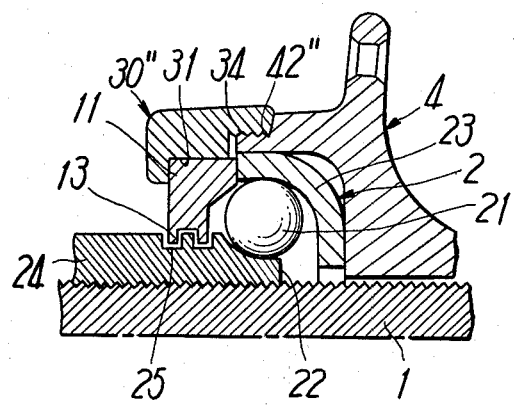
Figure 6:
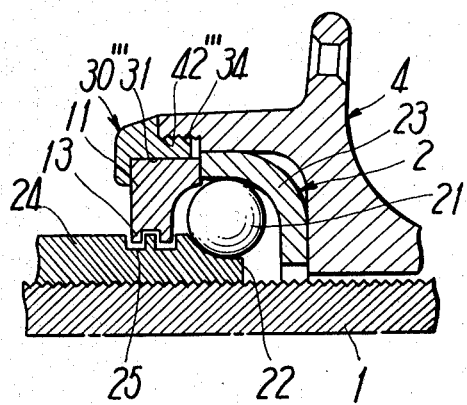

A second fixing means, as shown in FIGS. 5 and 6, uses a mounting member 30" (FIG. 5) provided at the inner periphery or a mounting member 30''' (FIG. 6) provided at the outer periphery of its one axial end with a screw thread 34. The hub shell 4 is provided at its outer (FIG. 5) or inner (FIG. 6) periphery with a screw thread 42" (FIG. 5) or 42''' (FIG. 6) with the screw thread 34 so that the screw threads 34 and 42" (FIG. 5) or 34 and 42''' (FIG. 6) are screwably engaged to thereby fix to the hub shell 4 the sealing members 11 and 12 held at the holding portion 31.

Figure 7:
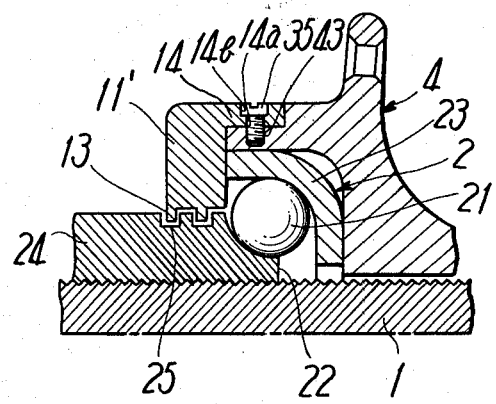

A third fixing means is shown in FIG. 7, in which the respective sealing members 11' and 12' (not shown) are provided with a mounting projection 14 extending circumferentially and projecting axially rightward (in FIG. 7) of the sealing member, the mounting projection 14 having a through bore 14a for inserting a mounting bolt 35 and a recess 14b for receiving the head of bolt 35. The hub shell 4 is provided at its one axial end with a threaded bore 43 corresponding to the bore 14a, so that the bolt 35 is inserted through the bore 14a and screws with the threaded bore 43, thereby fixing to the hub shell 4 the sealing members 11 and 12 in close contact at both the end faces.

Figure 8:
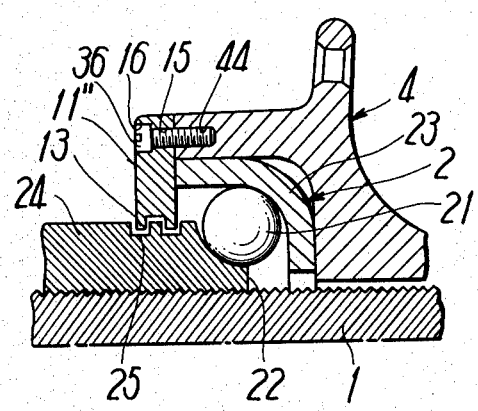

A fourth fixing means is shown in FIG. 8, in which the respective sealing members 11' and 12' (not shown) are provided near the outer periphery thereof with a through bore 15 extending axially of the sealing member for inserting a mounting bolt 36 and with a recess 16 for receiving the head of bolt 36. The hub shell 4 is provided at one end face with a blind threaded bore 44 corresponding to the through bore 15, so that the mounting bolt 36 is inserted through the bore 15 and screws with the bore 44 to thereby fix to the hub shell 4 the sealing members 11 and 12 in close contact at both end faces.

Figure 9:
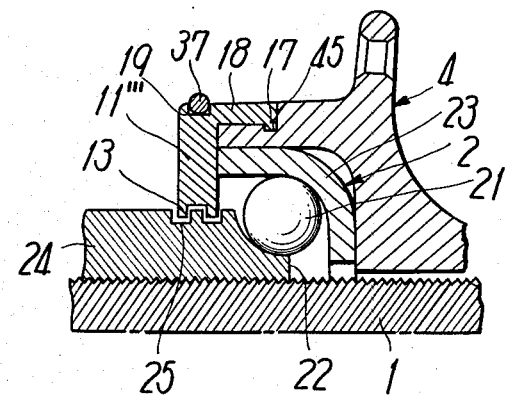

A fifth means is shown in FIG. 9, in which the respective sealing members 11''' and 12' (not shown) have at one axial end a projection 17 extending circumferentially and projecting radially inwardly of the sealing member and being connected through a connecting portion 18, and are provided at the outer periphery with a semiannular groove 19. The hub shell 4 is provided at the outer periphery of one axial end with a circumferential groove 45 engageable with the projection 17, so that the projection 17 is insertable with and engages the groove 45. A C-like shaped snap ring 37 is fit into the groove 19, thereby fixing to the hub shell 4 the sealing members 11 and 12 in close contact at both the end faces.

The fixing means in the above described embodiments fixes the first and second sealing members 11 and 12, for example, to the hub shell 4 in such a manner that the sealing members 11 and 12 are separately fit onto the outer periphery of bearing cone 22 to allow the ridges 13 to engage with the grooves 25 and are fixed by the fixing means so that ridges 13 are opposite to the grooves 25 at minimum intervals, thus forming a zigzag, narrow and annular opening of the respective sealing members 11 and 12, ridges 13 and grooves 25.

Consequently, a gap between the hub shell 4 and the bearing cone 22 can be closed and the opening has a labyrinth effect to reliably prevent dust or rain water from entering the bearing 2.

In other words, dust or rain water, should at first pass through an outermost narrow portion of an opening formed between the side walls of the first groove 25 at the bearing cone 22 and first ridges 13 at the sealing members 11 and 12, thereby being substantially prevented, at this stage, from further entry. The dust or rain water which has passed through the outermost portion of opening should pass through the next portion of the opening between the bottom face of first groove 25 and the tops of first ridges 13. Furthermore, the dust or rain water which has passed through the next portion of the opening should sequentially pass through the following portion between side walls of groove 25 and ridges 13.

In brief, the opening is not throughout straight, but zigzag, so that as the dust or rain water passes through each portion of the opening, resistance against its passing increases not permitting it to enter the bearing 2 with ease. Besides this, the extension 24 of bearing cone 22 and sealing members 11 and 12 are free from contact with each other, thereby rotating the hub shell 4 without hindrance.

The sealing construction of the invention, which is applied to the axially left side of hub shell 4 in the aforesaid embodiment, is similarly applicable to the axial right side of the hub shell 4.

The hub, as shown in FIG. 1, incorporates at the right side a driving member 52 having sprockets 51, and the first and second sealing members 11 and 12 may be fixed onto the inner periphery of driving member 52, and a bearing cone 53 at the bearing 3 screwed with the hub shaft 1 is and made engageable with the sealing members 11 and 12, so that the sealing construction of the invention is applicable similarly to the right side of the hub shell. In addition, a sealing member 54 of flexible material the same as in the conventional example is mounted on the bearing cone 53.

Also, the sealing construction of the invention is applicable to rotating portions, other than the hub, for example, between a head pipe of the bicycle frame and a front fork supported rotatably by the head pipe, a bottom bracket and a crank shaft supported rotatably thereon, and pedal shafts and pedal bodies supported rotatably thereon.

In brief, the sealing construction of the invention is applicable to all rotating portions for supporting rotary members rotatably on stationary members through bearings, which will be easily understandable by those skilled in the art.

In addition, in the aforesaid rotating portions, the stationary members include the hub shaft, head pipe, bottom bracket and pedal shafts, and the rotary members include the hub shell, front fork, crank shaft and pedal bodies.

As clearly understood from the aforesaid description, the sealing construction of the invention is so constructed that the first and second sealing members are made simicircular and fit onto the outer periphery of the bearing cone in an embracing manner to be coupled in ring-like shape, and that, at the outer periphery of the bearing cone and the inner peripheries of the first and second sealing members opposite to the bearing cone, are provided ridges and grooves extending circumferentially and engageable with each other through gaps having a minimum length. Hence, while the sealing members are easily mountable on the stationary member or rotary member, the ridges and grooves engage with each other at with a minimum gap leaving a narrow opening between the same, thereby closing the gap between the bearing cone and the stationary or rotary member. Hence, the labyrinth effect can reliably prevent dust or rain water from entering the bearings, and the bearing cone and sealing members are free from contact with each other so that the rotary members can rotate more smoothly and lightly in comparison with the conventional sealing construction in which the stationary or rotary member contacts with the sealing member.

As many apparently widely different embodiments of this invention may be made without departing from the spirit and scope thereof, it is to be understood that this is not limited to the specific embodiments thereof except as defined in the appended claims.

What is claimed is:

1. A sealing construction for a rotating portion of a bicycle having a rotary member supported rotatably on a stationary member through at least one bearing, said sealing construction comprising:

a bearing cone forming a ball race of said bearing which is provided on one of said rotary and stationary members, said bearing cone having a cylindrical extension extending axially outwardly of said ball race, a ring-like shaped sealing member formed by at least two sealing members, each of which forms part of said ring-like shape, said ring-like shaped sealing member being fixed to the other of said rotary and stationary members, and having an inner peripheral surface, formed by the inner peripheral surface of said first and said second sealing members, opposite to and surrounding said extension, the outer peripheral surface of said extension and opposing inner peripheral surface of said ring-like sealing member being provided with ridges and grooves which alternate in an axial direction of said extension and extend circumferentially of said extension and which intermesh with each other with a minimum interval therebetween to form a labyrinth seal; and, fixing means for holding said first and second sealing members in close contact to form said ring-like shaped sealing member and for fixing said ring-like shaped sealing member to said other of said rotary and stationary members.

2. A sealing construction according to claim 1, wherein one of the peripheral surface of said bearing cone and opposite surface of each of said first and second sealing members comprises ridges and the other comprises grooves.

3. A sealing construction according to claim 1, wherein said fixing means comprises a ring-like shaped mounting member having an annular holding portion for receiving therein said first and second sealing members, and including engaging means engageable with the other of said stationary member and rotary member, on which said first and second sealing members are mounted.

4. A sealing construction according to claim 1, wherein said fixing means comprises a mounting portion extending axially of each of said first and second sealing members and mounting means for mounting said mounting portion to one of said stationary member and rotary member, on which each of said first and second sealing members is mounted.

5. A sealing construction according to claim 4, wherein at the outer peripheries of said first and second sealing members are provided engageable grooves extending circumferentially of said first and second sealing members, said engageable grooves being engaged with a snap ring.

6. A sealing construction according to claim 1, wherein said fixing means comprises mounting screws, said first and second sealing members have through bores for said mounting screws, and one of said stationary member and rotary member, on which said first and second sealing members are mounted, has a threaded bore.

* * * * *